United States Patent [19]
Eaton et al.

[11] 3,821,525
[45] June 28, 1974

[54] METHOD AND APPARATUS FOR AUTOMATICALLY COMPENSATED TUBE BENDING

[75] Inventors: Homer L. Eaton, Balboa; Walter I. Shevell, Arcadia, both of Calif.

[73] Assignee: Conrac Corporation, New York, N.Y.

[22] Filed: Mar. 16, 1972

[21] Appl. No.: 235,283

[52] U.S. Cl. .............. 235/151.1, 72/8, 72/DIG. 22, 72/702, 444/001
[51] Int. Cl. .......................... G06f 15/46, B21d 7/14
[58] Field of Search .......... 72/7, 8, 9, 702, DIG. 22; 235/151.1, 151.11; 444/001

[56] References Cited
UNITED STATES PATENTS

| | | | |
|---|---|---|---|
| 3,156,287 | 11/1964 | Munro | 72/DIG. 22 |
| 3,333,445 | 8/1967 | Mergler et al. | 72/9 |
| 3,352,136 | 11/1967 | Clarke | 72/9 |
| 3,459,018 | 8/1969 | Miller | 72/7 |
| 3,512,383 | 5/1970 | Arnold et al. | 72/DIG. 22 |
| 3,553,989 | 1/1971 | Munro et al. | 72/8 |
| 3,592,029 | 7/1971 | Ritter et al. | 72/DIG. 22 |
| 3,653,251 | 4/1972 | Coonan | 72/7 |

*Primary Examiner*—Felix D. Gruber
*Attorney, Agent, or Firm*—Fulwider, Patton, Rieber, Lee & Utecht

[57] ABSTRACT

Method and apparatus for automatically compensating specified tube bend data for angular, fixed and radial springback to generate commanded machine axis motions which will result in the specified bent tube. For a given tube material and bending machine configuration, a calibration run is performed with a test tube and, thereafter, for that material and machine configuration, a tube of any shape can be produced from the specified bend data alone. Bends of radius greater than the machine bend die radius can be produced by automatically calculating and executing the axis commands for a series of incremental bends. The system incorporates a control sequence using operator response to machine generated questions and statements as well as general input and output capabilities.

15 Claims, 7 Drawing Figures

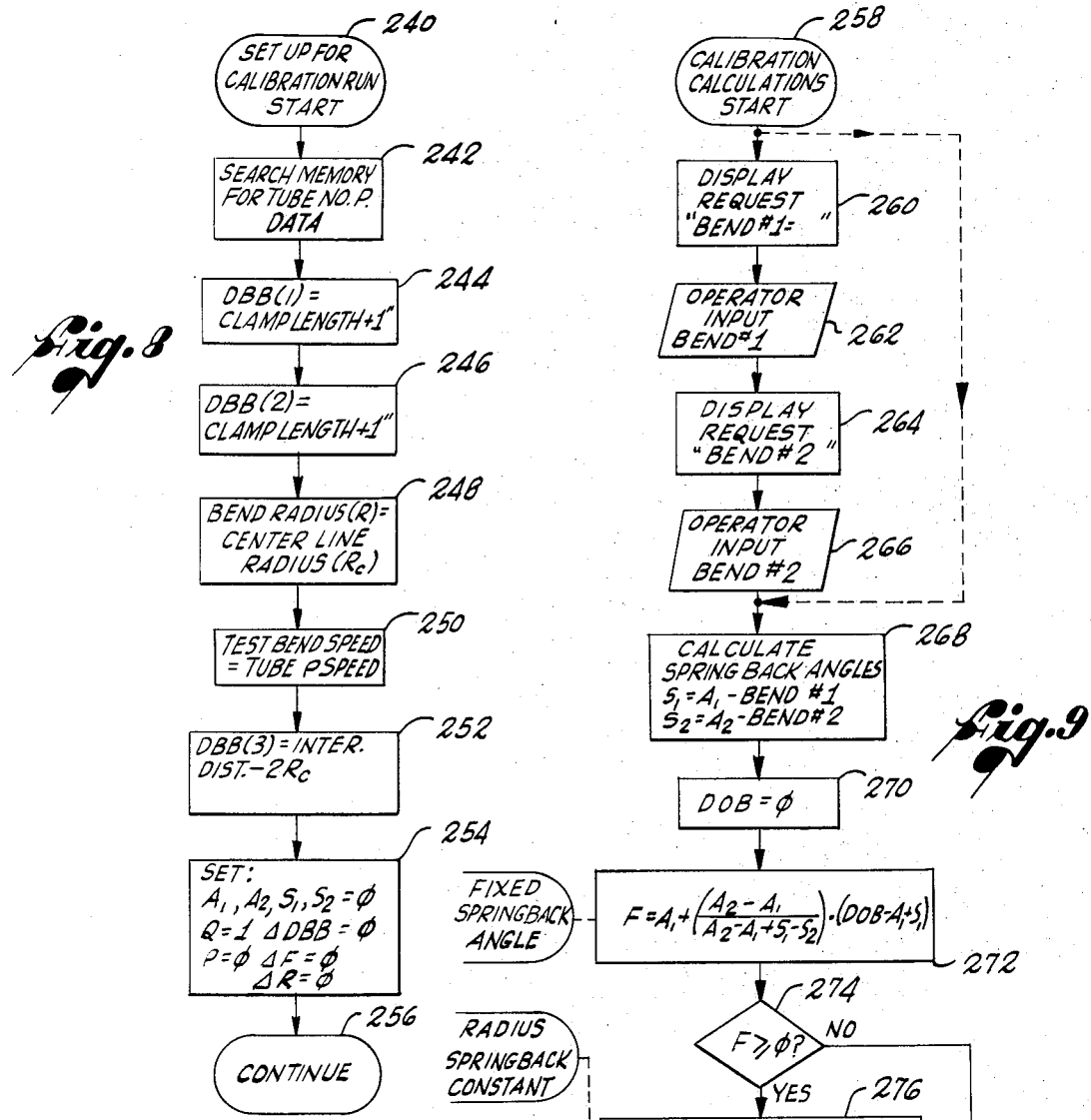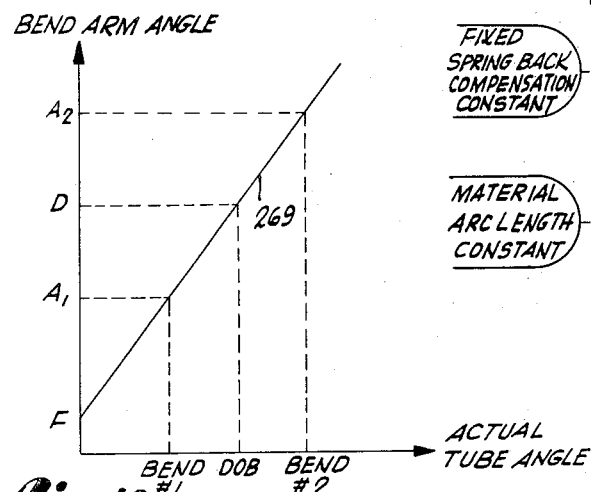

METHOD AND APPARATUS FOR AUTOMATICALLY COMPENSATED TUBE BENDING

BACKGROUND OF THE INVENTION

The present invention relates generally to automatic work forming and more particularly, to a system for tube bending which includes automatic compensation of specified bend data for springback and material deformation.

In the field of material work forming, the given specifications for the shape of the final object normally cannot be directly used as commands for execution by a machine under automatic control. This is due to the fact that the material to be worked, usually metal, exhibits resiliency so that, when the material is bent and released, it "springs back" slightly toward its original shape.

For example, in the field of tube bending, the specifications for a tube having multiple bends are based on rigid angles and the absolute distances between those angles. As such rigid angles cannot be bent in a tube, the bend data for such a tube is commonly given in terms of bend angles based on a single given bend radius and the distance between the ends of the bends themselves.

In order to bend a tube to a desired bend angle, it is necessary to initially "overbend" the tube so that, when released, it will spring back to the desired bend angle. However, because of the resiliency of the tube material, when the tube is released after overbending, there are small fixed portions of the tube at each end of the bend which are not bent to the yield point and which return to their original straight condition. The given distance between bends must be adjusted to compensate for these straight sections due to "fixed springback."

Furthermore, when the tube springs back after overbending, the radius of the bend increases due to "radial springback" by an amount dependent on the degree of bend. Thus, the resultant bend radius is rarely the same as the given bend radius of the bend data and the given distance between bends also must be adjusted to compensate for that radial difference in order to adhere to the absolute specifications of the tube.

During the bending process, there is the possibility of elongation or foreshortening the length of the tube through forces exerted by the machine tooling. A tube cut to the length specified by the given bend data may not be the correct size when the tube is finally bent.

Heretofore, even in automatically operated tube bending machines, the bend data could not be used directly to produce a tube having the specified shape. Operating commands first had to be empirically derived by experimentally bending a tube to the specified shape. As the compensating factors are dependent on the resiliency of the tube material, the operating commands to produce the same tube had to be empirically derived for each type of tube material used. Thus, there has been a need for a method and system for tube bending which permitted the automatic bending of a tube of any material using only the original bend data. The present invention meets that need.

SUMMARY OF THE INVENTION

The method and apparatus of the present invention provides for the automatic derivation of the compensating factors needed for automatic work forming, particularly to bend a tube to a specified shape. The tube may then be produced directly from the original bend data without intervening empirical steps.

The characteristics of the tube material and machine configuration are quickly and easily determined in an automatic calibration procedure by making test bends in a length of the tube material to be used. If a different material is to be used later, or if the machine configuration is changed, it is only necessary to repeat the calibration operation to make test bends in the new tube material. In the presently preferred embodiment of the invention, operating commands for an automatic tube bending machine are derived by calculation, preferably within a digital computer, from the original bend data and the results of the calibration operation.

While the operating commands for each bend are normally calculated just prior to the machine execution of the bend, a feature of the invention is that all of the compensating factors for the entire tube may be separately precalculated to derive the exact length of tube required to produce the tube specified by the bend data. Thus, when a number of tubes are to be produced, the tube stock may be cut in advance to the exact length required.

While the format of the preferred embodiment of this invention allows for a general input of data from a tape reader, for example, the operation of the complete unit is greatly simplified by storing the bend data for a number of different types of tubes within the computer and utilizing a simplified operator control unit which displays questions and statements to which the operator responds. The format of the invention also provides for the generalized output of data from the computer such as to a keypunch or to a display in the operator control unit.

As the compensating factors are mathematically calculated within the computer, the complete system has the capability of utilizing a single bend die radius to produce bends of considerably larger radius. This is accomplished by dividing the large radius bend into a combination of smaller incremental bends all of which are compensated. It will be appreciated that the use of such an incremental bending technique allows the generation of complicated three-dimensional bends such as coils, helixes or the like.

Thus, the method and apparatus of the present invention permits the direct use of original bend data in producing a tube meeting absolute specifications. All compensating factors are derived in the computer to produce machine operating commands which will result in a correctly shaped tube. The complete compensation of the operating commands permits the machine apparatus to automatically make bends of a large radius by performing a number of individually compensated incremental bends.

DESCRIPTION OF THE DRAWINGS

FIG. 8 is a flow chart of the first part of a calibration subroutine;

FIG. 9 is a flow chart of the second part of the calibration subroutine;

FIG. 10 is a graph illustrating the effects of springback;

DESCRIPTION OF THE PREFERRED EMBODIMENT

Figure 1:
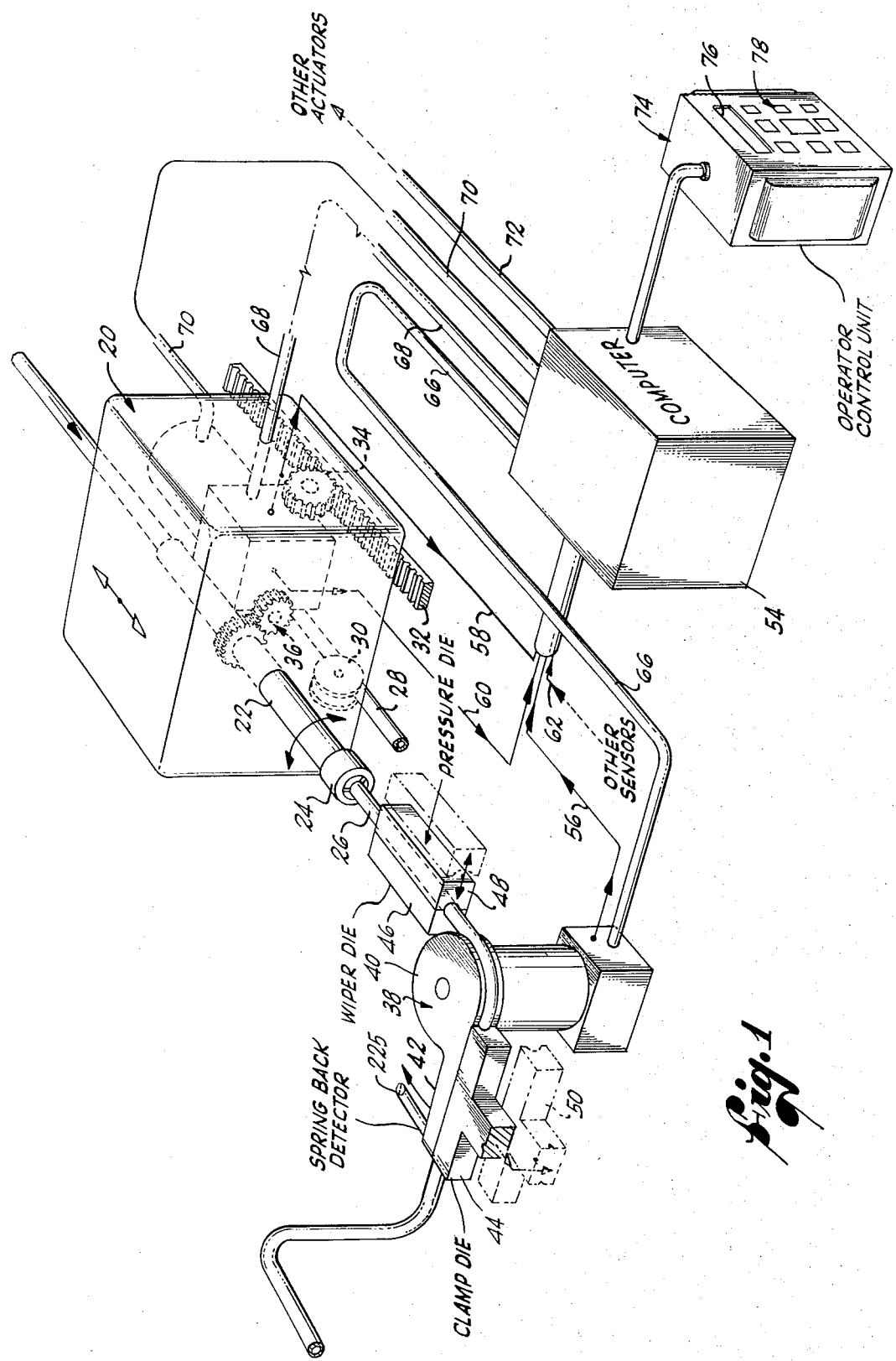
FIG. 1 is a pictorial view of the pertinent parts of an automatic tube bending machine under computer control.

Turning now to the drawings, and particularly FIG. 1 thereof, the method and apparatus for automatic tube bending of the present invention is in the form of a complete system including a substantially conventional automatically controlled tube bending machine.

The general operation of such a machine is well known in the art and the following brief description of the pertinent parts of the machine and its operation are only for the purpose of establishing an environment for the novel features of the present invention.

The machine includes a carriage assembly 20 which has a rotating collet chuck 24 for selectively gripping the end of a length of tubing 26. For purposes of illustration, the carriage 20 is supported for movement along the longitudinal axis of the tubing 26 by means of a rail 28 and roller 30, and a rack 32 and pinion 34. The collect chuck 24 is supported by a hollow spindle 22 which is conventionally rotated by means of a pair of gears 36 to thereby rotate the tube 26 about its axis. The driving force for the pinion 34 and gears 36 is derived from conventional servomechanisms the design of which will be apparent to those skilled in the art and will therefore not be described in detail herein.

The tube 26 is conventionally longitudinally moved with respect to a bend die 38 which has a circular portion 40 and a tangentially extending arm portion 42 of which have a semicircular peripheral groove substantially the same radius as that of the tube 26. In FIG. 1, the bend die 38 of tube 26 are shown as they would be following a bend and, it will be understood that before the bend, the arm 42 extends in the same direction as the tube and in its straight condition, half of the tube lies within the peripheral groove of the bend die.

When a bend in the tube 26 is desired, the tube is moved to a correct position, to be determined as described below, by means of the carriage 20 and a clamp die 44, also having a semicircular groove, clamps the tube in position against the arm portion 42 of the bend die 38. The clamp die 44 is conventionally carried by the same support structure which carries the bend die 38 and rotates with the bend die 38. In automatic tube bending machines of the type illustrated in FIG. 1, a wiper die 46 and an associated pressure die 48 are also provided to grip a portion of the tube 26 behind the bend to provide controlled elongation of the tube around the bend.

When a bend is completed, the pressure die 48 is released to permit the carriage 20 to move the tube 26 to a new position. The clamp die 44 is also released and lowered as illustrated by the phantom line drawing 50 of FIG. 1, to permit the bent tube 26 to be moved past the clamp die.

The tube bending machine is under the control of an automatic controller or computer 54, which is generally of a size and complexity known as a minicomputer such as a Honeywell H-112 or the equivalent, and sensors indicating the position of the bend die 38, carriage 20 and collet chuck 24 are connected to the computer by means of lines 56, 58 and 60, respectively. As will be appreciated by those skilled in the art, the operation of an automatic machine requires numerous other sensors such as limit switches and the like which are shown as being connected to the computer through a line 62.

As will be described more fully below, the computer 54 generates operating commands which are executed by the servomechanisms of the bend die 38, pinion 34 and the gears 36, through lines 66, 68 and 70, respectively. It will also be appreciated by those skilled in the art that numerous other actuators such as solenoids and the like are necessary for the operation of such an automatic machine and control signals for those actuators are generally shown as supplied by a line 72.

While the computer 54 utilized with the presently preferred embodiment of the system may receive inputs from such conventional sources as tape or punched cards, one novel and improved feature of the present invention is that control instructions may be entered into the computer 54 by means of an operator control unit 74 incorporating a well known display-response technique which can easily be used by personnel unskilled in the operation of a computer. The control unit 74 includes a visual display 76 for presenting various questions and statements to which the operator responds by means of simplified controls 78 which may include a numeric keyboard and various conventional control keys such as start, stop, and the like. However, the illustrated control unit 74 may be of any convenient configuration suitable for a display-response technique.

Figure 2:
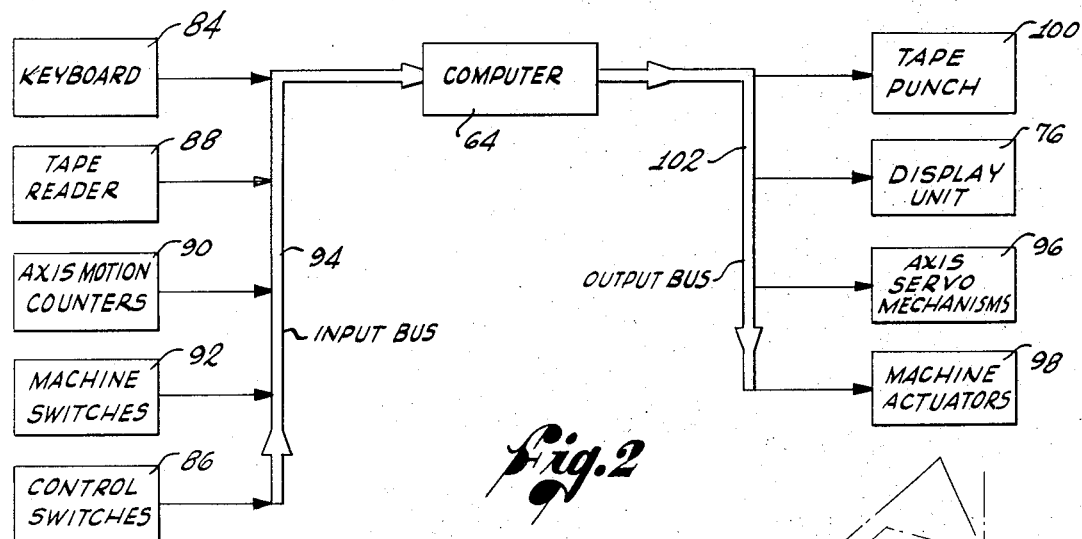
FIG. 2 is a block diagram of the main input and output devices for the computer.

Generally, the interconnection of the various components of the system with the computer 54 uses a well known scheme such as that illustrated in FIG. 2. As shown, the computer receives external inputs from a keyboard 84 which, in the presently preferred embodiment of the system, need only be a numeric keyboard with minimal additional characters such as a decimal point. The control panel 78 also includes a number of conventional control switches 86 for starting, stopping, and interrupting the operation of the system. The computer 54 may also be utilized with other conventional input devices such as a tape reader 88 or the like.

As mentioned above, the position of the tube along three separate axis is controlled by well known conventional techniques, and that position is determined by means of axis motion counters 90 which also serve as inputs to the computer 54. Conventional limit switches and the like needed for the operation of such an automatic machine are also inputs to the computer 54 and are grouped together as machine switches 92. All of the inputs to the computer 54 are connected to a common input bus 94 and the various input devices are periodically interrogated by the computer 54 using well known data processing techniques which form no part of the present invention.

The computer or automatic controller 54 conventionally generates operating commands which control the position of the tube along the three axes by means of axis servomechanisms 96. Other control signals are applied to a number of machine actuators 98 which include solenoids and the like conventionally needed for the operation of such an automatic machine.

In an operator response input technique novel in the field of tube bending machines, the computer 54 generates questions and statements sent to a display unit 76 which in conjunction with operator responses through the keyboard 84, permits proper control of the system. If desired, the computer 54 may supply data to any conventional output devices such as a tape punch 100. All of the output devices are commonly connected to a single output bus 102 with output signals sequentially sent to each device.

The specifications for a tube, or bend data, may be given in various well known forms such as the absolute dimensions from a fixed reference point or point-to-point dimensions along the length of the tube. It should be appreciated that the bend data may be in any input format and suitable conversions made within the computer 54 as necessary.

In the format illustrated and described herein, the bend data for a single bend includes three standard and separate items. In particular, one specified item is the distance between the last bend and the new bend to be made, called the distance between bends (DBB). At the beginning of the tube, the DBB is the distance from the end of the tube to the first bend. The second item is the bend angle called the degree of bend (DOB) and the third item is the angular difference between the plane of the last bend and the plane of the new bend, called the plane of bend (DOB).

Figure 3:
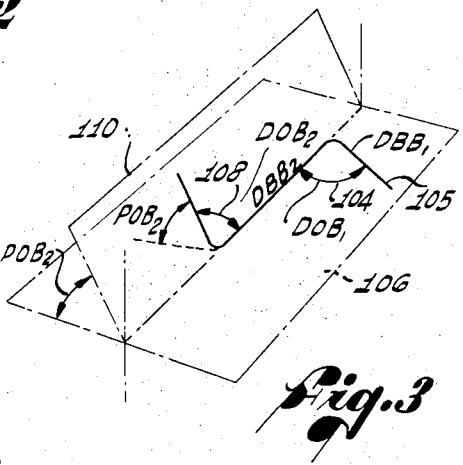
FIG. 3 is an example of the center line of a tube illustrating the major parts thereof.

The relationships between these three dimensions for an illustrative tube is pictorially illustrated by FIG. 3. For a first bend 104 the DBB dimension is the difference from an end 105 of the tube to the beginning of the bend. $DOB_1$ is the angle of the first bend 104. The first bend 104 establishes the first plane 106 which then serves as a reference plane for the following bend. The POB for the first bend is arbitrary but is normally given as zero degrees. For a second bend 108, $DBB_2$ is the distance between the end of the first bend 104 and the beginning of the second bend. $DOB_2$ is the second bend angle and $POB_2$ is the angular distance between the first plane 106 and a second plane 110 for the second bend 108.

Typically, the required tube dimensions are specified in terms of straight lengths between bends and angular and positional relationships between those straight lengths to fit a particular application. While there is some practical limitation on the radius of the bend due to deformation of the tube material, the actual radius of the bend is normally not a critical dimension. Thus, while a bend radius ($R_B$) is given as part of the bend data for a particular tube or bend, $R_B$ normally designates the nominal bend die radius ($R_C$) to be used in bending the tube.

Figure 4:
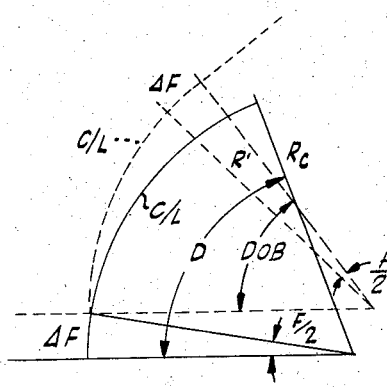
FIG. 4 is an example of a bend of large radius formed by three incremental bends.

As we discussed briefly above, due to the resiliency of the tube material, in order to produce a bend of a specified angle, it is necessary to overbend the tube slightly so that when it is released it will spring back to the correct angle. This process is illustrated in FIG. 4 in which the solid lines indicate the center line of the tube ($C_L$) around a bend die of radius $R_C$ and the phantom lines indicate the same center line of the tube with a radius (R') after the tube is released. Thus, it can be seen that in order to produce a specified bend angle, it is necessary to compensate for the angular springback by predetermining the amount of overbend required.

Due to the resiliency of the tube material and the increased radius of the bend after release, called radial springback herein, it is also necessary to adjust the length of the distance between bends so that, after the bend is made the positional relationship between the straight sections of the tube will be as specified. In particular, as a bend is made there will be a short section at the beginning and end of the bend which is not deformed through a sufficient bend angle to cause the material to yield. Therefore, these sections will spring back to their original straight condition when the tube is released. Furthermore, these short sections will return to their straight condition regardless of the angle through which the tube is bent. The portion of the overbend angle which thus returns to the straight condition is herein called the fixed springback angle. The small straight sections must be considered as part of the straight distance between bends and therefor must be initially subtracted from the given DBB in the bend data in order to correctly position the tube.

As can also be seen in FIG. 4, the radial springback when the tube is released has the effect of altering the positional relationship of the straight sections of the tube at either end of the bend. Thus, in order to maintain the correct relationship, the distance between bends dimension is further shortened by an amount which can be shown to be related to the radial springback and the bend angle.

Thus, in addition to determining the degree of overbend necessary to produce the desired bend angle, it is also necessary to adjust the distance between bends to allow for the fixed springback and the radial springback before the bend can be correctly executed. Heretofore, only the overbend angle has been considered for automatic compensation.

The method and apparatus of the present invention provides a new and improved means for systematically and automatically predetermining the proper degree of overbend and fixed and radial compensation to produce a tube having the proper shape. As was briefly described above, the only input needed in addition to the bend data is the results of a calibration run using a tube of the desired material. Thereafter, the bend data alone is all that is needed to automatically produce a tube of any desired shape as long as the tube material and machine configuration remain the same. Should a tube of a different material be required, or the machine modified, it is only necessary to perform the calibration run with a tube of the new material prior to bending the tube. In addition, the bend data is tested to determine whether the bend may best be executed by means of a series of incremental bends.

The system of the invention is implemented by means of a programmed digital computer and the operation of the system is best described by reference to a series of abbreviated flow charts of the relevant routines and subroutines of the program.

MODE SELECTION ROUTINE

Figure 6:
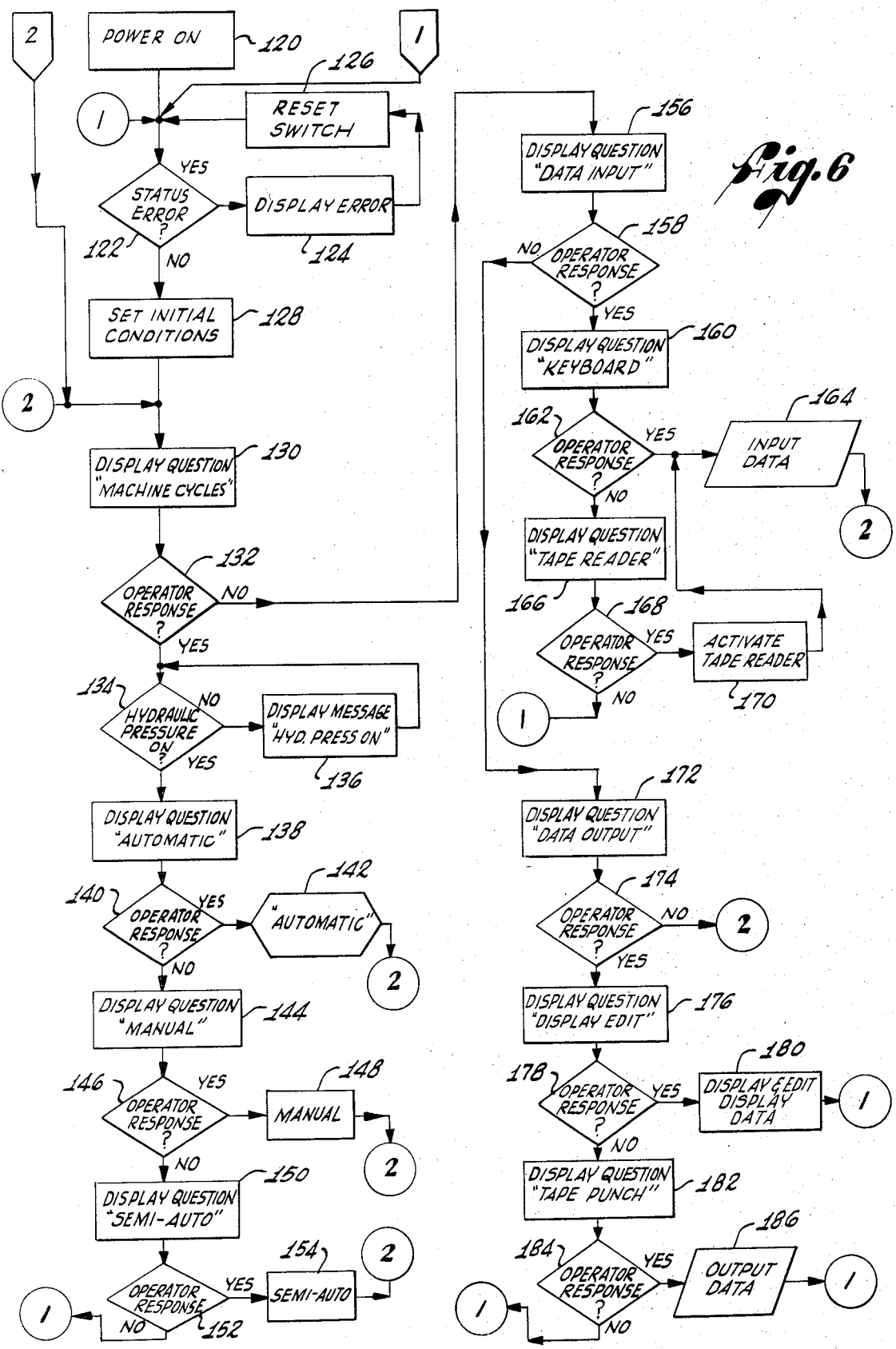
FIG. 6 is a flow chart of a mode selection routine for the presently preferred embodiment of the invention.

It has been found preferable to operate the automatic tube bending machine with an operator response type of control which is illustrated by means of the flow chart of FIG. 6. However, it should be appreciated that other types of control techniques may also be utilized for other applications.

To provide versatility, three different modes of operation, automatic, manual, and semi-automatic, are provided. Additionally, the usual input and output modes are provided so that data may be entered and removed from the computer 54 (FIG. 2).

As illustrated in the flow chart of FIG. 6, control of the automatic tube bending machine and associated computer 54 is effected by a mode selection routine which displays a sequence of questions and statements to which the operator responds by means of the keyboard 84 and control switches 86 (FIG. 2) which make up the control unit 78 shown in FIG. 1. While a presently preferred mode selection routine is shown by the flow chart of FIG. 6, it should be appreciated that the flow chart is illustrative only and that many other routines are possible. It should also be noted that the flow chart has been abbreviated to eliminate a number of error checking steps which are well known to those skilled in the art of automatically operated machines.

Basically, the mode selection routine begins by turning the power on at 120 followed by a checking of the status of all the elements of the machine at 122. If there is a status error, the location of the error is conventionally determined and displayed at 124 and, when the operator has corrected the error, the routine is started again by means of a reset switch 126.

When the machine is ready for operation, a number of initial conditions are conventionally set at 128 which are dependent upon the type of computer 54 (FIG. 1) used.

The tube bending machine and computer is new ready for operation and the question "MACHINE CYCLES" is displayed at 130. The answer to this question determines whether the machine is to be operated to bend a tube or if there is to be an input to or output of data from the computer 54. Thus, if the operator presses the "NO" button, the negative response at 132 sets up the computer to input or output data. If the operator response at 132 is "YES," a check is made at 134 to determine if the hydraulic pressure is on and capable of operating the machine. This step is used in the presently preferred embodiment because the servo-mechanisms employed are hydraulically actuated. If the hydraulic pressure is not on, a message to that effect is displayed at 136 until the pressure is on and sufficient to operate the machine, at which time the question "AUTOMATIC" is displayed at 138. If the machine is to be automatically operated, the operator response at 140 is "YES" and an automatic subroutine 142 is executed, as will be more fully described below.

Following the execution of the automatic subroutine 142, the routine returns through connector 2 to the question "MACHINE CYCLES" at 130. If the operator response at 140 to the question "AUTOMATIC" is "NO," the question "MANUAL" is displayed at 144. If the machine is to be manually operated, the operator response at 146 is "YES" and the machine is conventionally manually operated at 148. Again, following the manual operation of the machine the routine returns through connector 2 to the question "MACHINE CYCLES" at 130.

If the machine is not to be manually operated, the operator response at 146 is "NO" and the question "SEMIAUTOMATIC" is displayed at 150. A "YES" response at 152 to the question permits the machine to be semi-automatically operated at 154 and again, following that operation, the routine returns through connector 2 to the question "MACHINE CYCLES" at 130. As there are only three modes of operation provided in the illustrated presently preferred control sequence, a "NO" response at 152 is returned through connector 1 to the start condition.

If there is to be an input or output of data to the computer 54 (FIG. 2) rather than a machine operation, the operator response at 132 to the question "MACHINE CYCLES" at 130 is "NO" and a data input or output determination is begun through connector 3 and the question "DATA INPUT" is displayed at 156. An operator response of "YES" at 158 results in the displaying of further questions regarding the type of data input. A "NO" response at 158 begins a sequence of questions regarding data output.

Thus, a "YES" answer at 158 results in the displaying of the question "KEYBOARD" at 160. A "YES" response at 162 to that question permits the input of data at 164 by means of the keyboard 84 and following that input, the routine is returned through connector 2 to the question "MACHINE CYCLES" at 130. If the operator response at 162 is "NO," the further question "TAPE READER" is displayed at 166 and a "YES" response at 168 to that question results in the activation of the tape reader at 170 permitting the conventional input of data by that means at 164, again followed by the return through connector 2 to the question "MACHINE CYCLES" at 130. In the illustrated mode selection routine data input is affected either by the keyboard 84 or the tape reader 88 (FIG. 2) and if the operator choses neither indicated by a "NO" response at both 162 and 168, the routine returns through connector 1 to the start condition.

As was briefly noted above, if data output is desired, the operator response at 158 is "NO" and a series of questions relating to the output of data is begun. Particularly, the question "DATA OUTPUT" is displayed at 172 to check to see if the operator desires that mode. Thus, an operator response of "NO" at 174 to the question "DATA OUTPUT" at 172 results in a return of the routine through connector 1 to the start condition. If the operator response at 174 is "YES," the question "DISPLAY EDIT" is displayed at 176 and operator response of "YES" at 178 results in the conventional displaying and editing of the data in a predetermined format at 180. Following the data display, the routine is returned through connector 1 to the start condition.

If the operator response at 178 is "NO," the question "TAPE PUNCH" is displayed at 182 and an operator response of "YES" at 184 to that question results in the conventional output of data at 186 by means of a tape punch 100 (FIG. 2). Following the tape punch data output, the routine returns through connector 1 to the start condition.

In the illustrated data output control sequence, data may either be displayed or punched and an operator response of "NO" to both of those output functions results in a return through connector 1 to the start condition. It should be appreciated that a number of other data input or output devices may be utilized with the mode selection routine appropriately modified to permit their use.

Thus, the use of the mode selection routine illustrated in FIG. 6 permits the automatic tube bending machine to be set up for operation in the automatic, manual or semi-automatic modes simply by the operator pressing a "YES" or "NO" button as the appropriate sequence of questions is displayed on the display unit 76 (FIG. 2). Additionally, the computer 54 may be set up to receive data as input from either a keyboard 84 or a tape reader 88 or set up to output data through the display unit 76 or a tape punch 100 (FIG. 2) also by simply answering "YES" or "NO" to a sequence of displayed questions. By use of this operator response control technique in the illustrated presently preferred embodiment, the use of specialized commands entered by means of a teletype or other input device is avoided so that the automatic tube bending machine may be operated by persons who have little or no skill in the operation of a computer.

While the tube bending machine of the present invention may be operated manually, it is principally intended for automatic operation in which the operator merely inserts a tube into the machine and starts its operation. Thus, the automatic subroutine 142 shown in FIG. 6 is the most often used mode of operation. The semi-automatic operation 154 is essentially the same as the automatic operation except that the machine is stopped after each step for inspection and must be manually restarted by the operator.

AUTOMATIC SUBROUTINE

Figure 7:
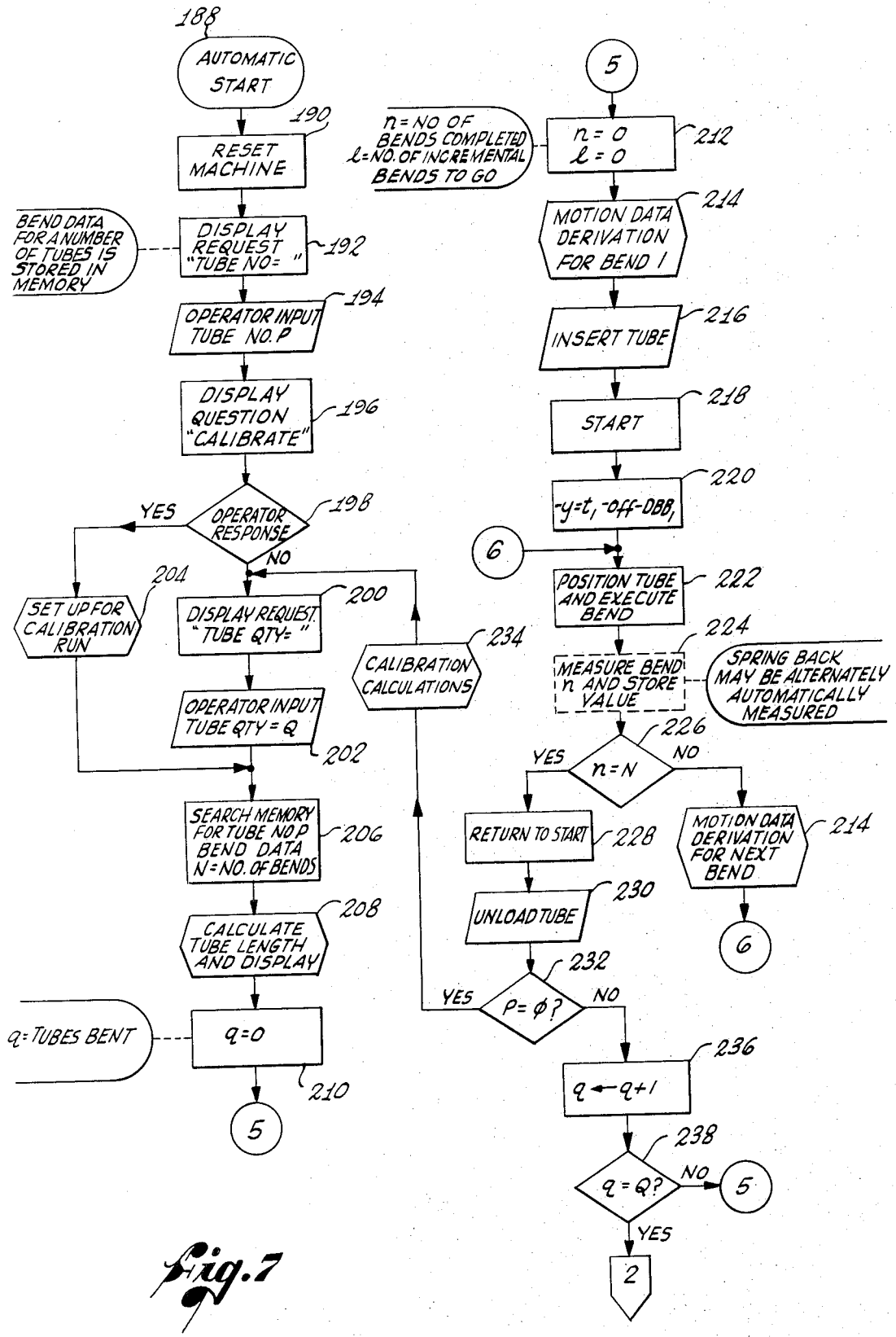
FIG. 7 is a flow chart of an automatic tube bending subroutine.

The automatic subroutine 142 shown in FIG. 6 is best illustrated by means of the expanded flow chart of FIG. 7. In the automatic mode, the operator, by means of responses to displayed questions and comments indicates which tube number is desired and the quantity of tubes to be run. Then, if necessary, a calibration run is made for the particular tube material to be used. Next, based on the bend data for the chosen tube, the compensated tube length is calculated and displayed so that the tube stock may be cut to the exact length needed for the tube. The tube is then inserted into the collet chuck 24 (FIG. 1) and the "START" button is depressed. The entire tube is then bent to the shape specified by the bend data and removed from the collet chuck 24 by the operator. The bending operation is repeated until the desired number of tubes have been bent.

More particularly, referring to FIG. 7, the automatic subroutine begins with an automatic start at 188 followed by a resetting of the machine at 190 to the starting position. At this point, the request "TUBE NO. = ___" is displayed at 192 to which the operator responds with an input of the general tube number $p$ at 194. It should be noted that tube No. p could be any one of a number of tube numbers with associated bend data stored in the computer 54 memory. Next, the question "CALIBRATE" is displayed at 196 and the operator may respond at 198 with "YES" if the calibration run is needed, or "NO" if the previously performed calibration run is applicable to the tube $p$ material.

If the calibration run is not required, a request "TUBE QTY. = ___" is displayed at 200, calling for the tube quantity, to which the operator responds by an input at 202 of the tube quantity "Q." If the calibration run is desired, the display at 200, and operator input at 202, are skipped and a calibration run set-up subroutine 204 is described more fully below with respect to the entire calibration run but it should be noted that the bend data for calibration purposes is stored as the tube No. zero bend data.

Following either the calibration run set-up subroutine at 204 or the input of the tube quantity at 202, a memory search is made at 206 for the tube No. $p$ bend data with N being specified as the total number of bends in tube $p$. A tube length calculation subroutine 208 is then performed and the exact tube length displayed. The tube stock can then be cut to the exact displayed length to reduce waste due to cutting the tube stock either too long or too short. The tube length calculation subroutine 208 is described in greater detail below.

Preparation is then made to bend a tube by initially setting certain conditions. Particularly, at 210 $q$, indicating the number of tubes which actually have been bent is set to zero. The automatic subroutine then proceeds through connector 5 where another condition $n$, the number of bends which have actually been made in the tube, and $l$, indicating the number of incremental bends needed for a complete bend, are both set to zero at 212. The necessity for setting $l = 0$ will be more fully discussed below with respect to the incremental bending feature of the present invention.

Following the setting of the initial conditions, a motion data derivation subroutine at 214 is executed to derive compensated operating commands for bending the tube to the specified bend angle and adjusting the length of the straight sections of the tube between bends. The motion data derivation subroutine 214 is discussed more fully below.

When the compensated command signals have been derived for general bend $n$, the operator inserts the tube at 216 into the collet chuck 24 (FIG. 1). The automatic bending sequence is then started at 218 and the collet chuck 24 grips the end of the tube. As the reset condition of the machine is with the collet chuck 24 adjacent to the wiper and pressure dies 46 and 48 shown in FIG. 1, the carriage 20 must first be moved back so that the free end of the tube 26 is adjacent to the bend die 38. The distance the carriage 20 must be retracted is partially dependent upon the total length of the tube inserted into the collet chuck 24 which was calculated in a separate subroutine at 208. The distance is also dependent on the particular tooling on the machine which, in the illustrated embodiment, comprises the length of the offset due to the bend and wiper dies 38, 46, respectively. The distance between the free end of the tube 26 and the position of the first bend is herein called $DBB_1$ and is also needed to determine the initial retraction of the carriage 20. The initial movement of the carriage 20 is calculated at 220 and the tube is positioned, and the bend executed, at 222.

Following the execution of the bend, an alternate step is provided in which the springback for bend $n$ is automatically measured and stored at 224. It should be noted that the automatic measurement at 224 is made only if the bend die 38 or clamp die 50 assemblies (FIG. 1) include an optional automatic springback detector 225. Following the alternate step 224, a check is made at 226 to see if all the bends have been made for the tube, or if $n = N$? If all of the bends have not been made, the motion data derivation subroutine 214 is again executed for the next bend and the subroutine is returned through connector 6 to position the tube and execute the next bend at 222.

If all of the bends have been completed for the tube, that is $n = N$ at 226, the machine is returned to its start position at 228 and the operator unloads the tube at 230.

At this point, it is determined whether the tube No. $p$ is zero at 232. In the calibration run subroutine 204, the tube number is 0, as noted above, and a calibration calculation subroutine 234 is executed and the subroutine returned to a display of the request for the tube quantity at 200.

If the tube No. $p$ is not zero, then the tube quantity $q$ is incremented by 1 at 236 and at 238 it is determined if all of the tubes have been bent or if $q = Q$. If not, the sequence is returned through connector 5 so that another tube can be bent. If all of the tubes have been bent, that is, $q = Q$, the sequence is returned through off-page connector 1 to the start condition of the mode selection routine shown in FIG. 6.

Thus, in the automatic subroutine the bend data for a requested tube member is taken from storage and the tube is bent in accordance with compensated operating commands to produce a tube in accordance with the uncompensated bend data. A calibration run is performed automatically in response to operator request. Once the calibration run has been made, any tube number $p$ can be automatically bent if the tube material and machine configuration remains unchanged. If either should be changed, it is merely necessary to re-execute the calibration run for the new conditions.

CALIBRATION SUBROUTINES

The calibration run set-up subroutine 240 is best illustrated by the expanded flow chart of FIG. 8. In the actual calibration run, two subroutines are used. The first is the calibration run set-up subroutine 240 in which the calibration run conditions are set for the present machine conditions, such as clamp length, and characteristics of the bend data to be executed such as the desired tube $p$ speed code calculations at 234. It is during these calculations that the information derived from two test bends in the desired tube material are reduced to compensating factors needed to derive the command signals derived in the motion data derivation subroutine 214.

The calibration run set-up subroutine is started at 240. Then a memory search is made at 242 for tube No. $p$ data needed in the calibration run. The first distance of the two bends DBB (1) is minimally set at the clamp length of the clamp die 44 (FIG. 1), plus a 1 inch margin at 244. Similarly, the second distance between bends DBB (2) is minimally set equal to the clamp length plus a 1 inch margin at 246. The bend radius ($R_B$) for the test bends is set equal to the center line radius ($R_C$) of the bend die 38, at 248. In order to duplicate the actual bending conditions as closely as possible during the test bends, the test bend speed is set equal to the tube $p$ speed code at 250. The third distance between bends DBB (3) is set at 252 equal to an interference distance, dependent upon the machine tooling arrangement as noted above, (FIG. 1) minus two times the center line radius, $R_C$ of the bend die 38. The interference distance is the minimum attainable distance between the collet chuck 24 and the bend die 38.

A number of initial conditions are then set at 254. Particularly, $A_1$, $A_2$, the test bend angles, and $S_1$, $S_2$, the springback angles, are all set to zero. The tube quantity Q is set equal to 1, and the tube No. $p$ is set equal to zero. The fixed springback factor $\Delta F$, the radius spring factor $\Delta R$, and the combined compensation factor $\Delta DBB$, which are to be calculated during the calibration run, are all set to zero. The automatic subroutine is then continued at 256 and the memory search for tube No. $p$ which is now tube No. zero is begun at 206 (FIG. 7).

The remainder of the automatic subroutine is utilized to execute the test bends from the bend data for tube No. zero. In particular, the first bend arm angle is $A_1$ and the second bend arm angle is $A_2$. Because of springback, the actual bend angles produced will be bend No. 1 and bend No. 2. The automatic subroutine continues until it is determined whether $p$ is zero at 232 at which time the calibration calculation subroutine 234 is utilized to determine the compensating factors.

The calibration calculation subroutine is started at 258 and there are to alternate methods of entering the bend angles, bend No. 1 and bend No. 2, into the computer 54. In particular, if the automatic springback detector 225 is used, bend No. 1 and bend No. 2 will have been previously stored at 224 in the automatic subroutine (FIG. 7). However, if the automatic springback detector 225 is not available, a request "BEND NO. 1 = " is displayed at 260 followed by an operator input of the value for bend No. 1 at 262. Similarly, a request "BEND NO. 2 = " is displayed at 264, again followed by an operator input of the value of bend No. 2 at 266. The springback angles $S_1$ and $S_2$ are then calculated at 268 as:

$S_1 = A_1 -$ BEND NO. 1; $S_2 = A_2 -$ BEND NO. 2.

The relationship between the bend arm angle of the clamp die and the actual tube angle is illustrated in FIG. 10, and results in a straight line 269 off-set along the bend arm angle coordinate by a distance F, which represents the fixed springback angle. It can be seen that the bend arm angle can be increased to the angle F without permanently deforming the material of the tube so that the actual tube angle remains zero degrees.

It can be shown that the equation for the line 269 is:

$$D = A_1 + [(A_2-A_1)/(A_2-A_1+S_1-S_2)] \cdot (DOB - A_1 + S_1)$$

where D is the overbend angle to produce the actual desired degree of bend DOB and $A_1$, $A_2$, $S_1$ and $S_2$ are as defined above. It can be seen that, if the desired degree of bend, DOB, is set at zero in the equation for the line 269, the fixed springback angle F will be obtained. Therefore, the desired degree of bend, DOB, is set at zero at 270 and that value substituted into the equation for the line 269 at 272.

Since the angle F must always be positive or 0, a test at 274 is made to see if it satisfies those conditions. If the condition is not satisfied, a status error is indicated and the calibration calculation subroutine jumps through the off-page connector 1 to the start condition in the mode selection routine of FIG. 6. If the condition is satisfied, the radius springback constant $\Delta R$ is calculated at 276. $\Delta R$ is the difference between the radius of the bend when released and the radius of the bent tube before release. It can be shown that, for relatively small angles, this difference in radii multiplied by the tangent of one-half the desired bend angle gives the correction to the distance between bends for radial springback, for each of the bends, or:

radial springback correction $(T_S) = \Delta R \tan (DOB/2)$

In terms of the results of the test bends, $\Delta R$ can be shown to be:
$\Delta R = [(S_{2-F}/A_1 - S_1) + (S_{2-F}/A_2 - S_2)] \cdot R_c = R' - R_c/2$
and is calculated at 276.

The fixed springback compensation $\Delta F$ constant is then calculated at 278. $\Delta F$ for each end of the bend can be shown to be equal to one-half the angle F in radians times the bend die radius, or $$\Delta F = (0.01745F/2) \cdot R_C$$

In order to calculate the tube length required for a given tube, it is necessary to know the relationship between the length of tubing going into a bend and the degree of bend for a given set of machine conditions, such as tube material and the pressure applied to the pressure die 48 (FIG. 1). This is most easily calculated by taking the average value of this relationship at the midpoint between the test ends. Thus, the relationship can be determined by relating the carriage movement ($CM_1$, $CM_2$) to the first and second bend arm angles which is done at 280. Then the relationship is:

$$\text{Arc Length } (J) = K \cdot DOB$$

The calibration calculations subroutine is then continued at 282 and returns to the automatic subroutine at 200 as shown in FIG. 7.

MOTION DATA DERIVATION SUBROUTINE

When the equation of line 269 of FIG. 10 is known, together with the radial and fixed springback constants, compensated operating commands can be generated by the motion data derivation subroutine 214 in the automatic subroutine.

Figure 11:
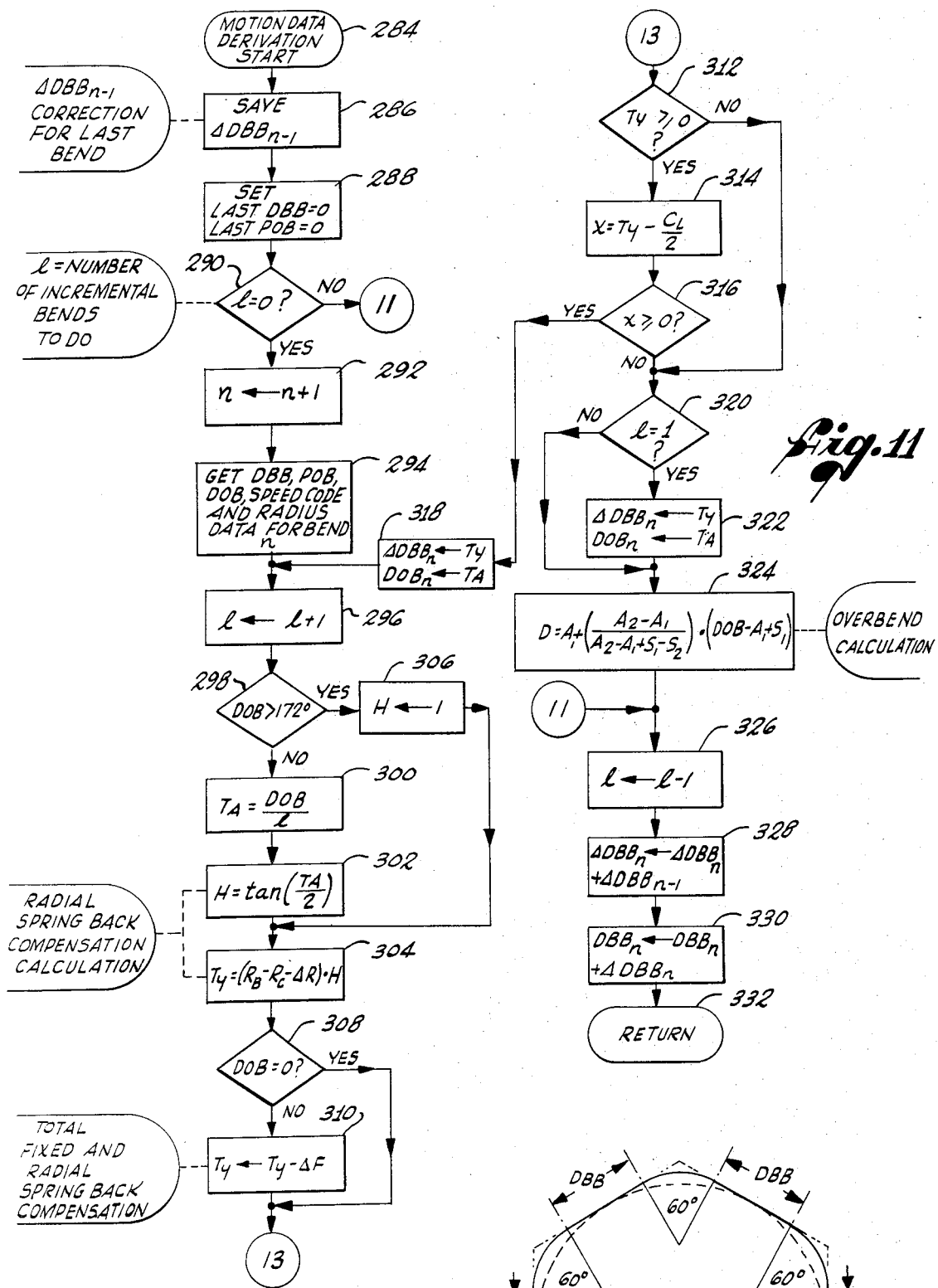
FIG. 11 is a flow chart of the motion data derivation subroutine.

Again, the operation of the motion data derivation subroutine 214 is best illustrated by the expanded flow chart of FIG. 11. In general, the necessary overbend angle is calculated directly from the equation of the line 269 in FIG. 10. The combined fixed and radial springback compensations for each general bend $n$, is labeled $\Delta DBB_n$ and the compensation is added to each end of the bend.

Figure 12:
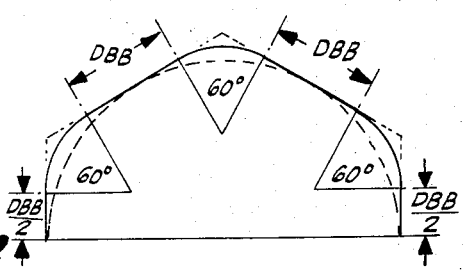
FIG. 12 is a graph illustrating radial springback.

As was briefly described above, an important feature of the invention is the ability to make bends having a radius considerably larger than the bend die radius by dividing the bend into a number of increments. An example of this technique is illustrated in FIG. 12 in which a 180° bend is divided into three bends of 60° each. It should be appreciated that, in the operation of the system of the invention, the large bend is divided into the greatest possible number of increments so that the shape of the bend approaches the specified shape.

In the derivation of axis motion commands, the bend data is always tested to see if incremental bending is possible and, if so, the technique is automatically employed with each incremental bend fully compensated. Thus, the optional bend form is automatically derived for every bend.

Therefore, after the motion data derivation subroutine is started at 284 and DBB compensation for the end of the last bend ($\Delta DBB_{n-1}$) is saved at 286 to be used in calculating the new $\Delta DBB$ compensation for new bend $n$. Then, to facilitate calculations for the new bend, the value of the last distance between bends DBB and the last plane of bend POB are set equal to zero at 288.

It is then determined at 290 if $l$ is zero. Normally, for the initial derivations for a bend, $l$ is set equal to zero at 210 in the automatic subroutine (FIG. 7).

But, if during the previous motion data derivation, it was determined that the bend could be accomplished by incremental bending, the term $l$ was derived as something other than zero and the check is made to see if an incremental bend is in process. If an incremental bend is being performed, $l$ will not be zero and the subroutine goes directly through connector 11 to perform the next portion of the incremental bend using the same compensated commands. If an incremental bend is not being performed, $l$ will be zero and the normal motion data derivation subroutine continues by incrementing $n$ at 292. Then, DBB, POB, DOB and the speed code and given bend radius for bend $n$ is obtained from memory 294. The term $l$ is then incremented by one at 296 as the first step in determining whether incremental bending is possible.

In the presently preferred embodiment the equation for determining the radial springback compensation reaches a practical limit at approximately 172° and at 298 it is determined whether the degree of bend (DOB) exceeds that angular limit. If not, a temporary term $T_A$ is calculated at 300 as the degree of bend (DOB) divided by the term $l$ which normally is 1, being incremented from zero at 296. If an incremental bend is being calculated, $l$ will be greater than one and indicates the number of potential incremental bends in the desired degree of bend DOB. As the radial springback compensation is to be made at each end of the bend, the intermediate term H is calculated as the tangent of one-half of the temporary term $T_A$ at 302 and the radial springback compensation calculation is made at 304. If the desired degree of bend exceeds the limiting angle 172°, the intermediate term H is temporarily set to the digit one at 306 which would correspond to a DOB of 90° and the radial springback compensation calculation for $T_Y$ is made with that value at 304.

The radial springback compensation $T_S$ was described above as being:

$$T_S = \Delta R \tan (DOB/2)$$

where $\Delta R = (R' - R_C)$ for the test bends. The compensation formula is generalized for variable given bend radii $R_B$ and bend die radii $R_C$ to:

$$T_y = (R_B - R_C - \Delta R) \cdot H$$

which reduces to $T_y = (R_B - R') \cdot H$, relating $\Delta R$ to the given bend radius $R_B$.

It should be appreciated that the given bend radius might be larger or smaller than the bend die radius and $T_y$ may be positive or negative. Typically, the given radius $R_B$ is less than $R'$, the increased radius due to the smaller bend die radius $R_C$ and $T_y$ is negative. However, when the given radius $R_B$ is much greater than the bend die radius $R_C$ and $R'$, $T_y$ will be positive and if larger than $\Delta F$, incremental bending is a possibility.

At this point, a check is made at 308 to determine if the degree of bend DOB is equal to zero and, if so, the subroutine skips to connector 13 immediately. If the degree of bend is not equal to zero, then the total fixed and radial springback compensation is calculated at 310 by subtracting the fixed springback compensation constant $\Delta F$ from $T_y$.

The subroutine then proceeds through connector 13 to a number of checks to determine if the bend may be made incrementally. Particularly, at 312, it is determined if the total compensation exceeds zero and, if not, incremental bending is either not possible or a limit on the number of bends $l$ has been reached. Therefore, the next two subsequent checks are skipped. If $T_y$ is equal to or greater than zero, it is necessary to determine if the incremental DBB between bends is possible with the clamp die 44 on the machine. It is possible if the compensation exceeds half of the clamp length as checked at 314 and 316. If the compensation exceeds half the clamp length, an incremental bend is possible and at 318 the term $T_y$ is temporarily substituted for $\Delta DBB$ and $T_A$ is temporarily substituted for the degree of bend DOB. The term $l$ is then incremented to 2 and the compensation calculation is repeated to test the possibility of increasing the number of possible incremental bends. The number of incremental bends $l$ can increase until the compensation goes negative as indicated by the test at 312 or the incremental DBB is not possible with the clamp die 44. If the tests for incremental bending failed the first time, then $l = 1$ but the compensation $T_y$ bend angle $T_A$ have to be substituted for $\Delta DBB_n$ and $DOB_n$. Therefore, at 320, if $l = 1$, indicating that this is the case, the substitutions are made at 322. However, if the test for incremental bending was performed at least once, then the substitutions were already made at 318, and $l$ is at least 2. Therefore, the answer at 320 is "NO" and step 322 is skipped. The overbend calculation is then performed at 324 and, to set the initial conditions for the next bend, incremental or not, $l$ is decremented by one at 326.

The DBB compensation calculation is then performed by adding the DBB compensation for the previous bend ($\Delta DBB_{n-1}$) to the presently calculated compensation $\Delta DBB_n$ and substituting the sum for $\Delta DBB_n$ at 328. The distance between bends $DBB_n$ is then calculated by adding the combined compensation $\Delta DBB_n$ to the present $DBB_n$ and substituting the sum for $DBB_n$ at 330. The motion data derivation subroutine is then completed and a return is made at 332 to the automatic subroutine.

Figure 5:
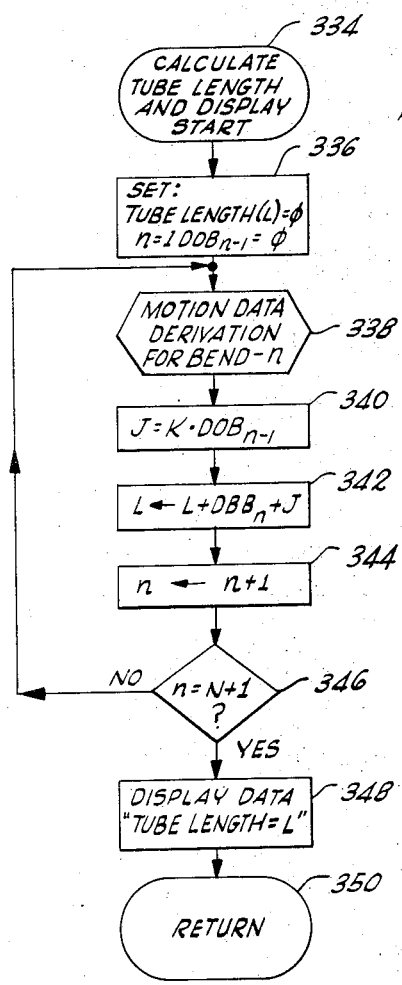
FIG. 5 is a flow chart of the subroutine for producing the total length of the tube required.

As was previously mentioned with respect to the automatic subroutine illustrated in FIG. 7 prior to the execution of the bend in general tube number $p$ a tube length calculation subroutine 208 is performed and the exact tube length for tube $p$ is displayed so that the tube stock may be cut to the exact length to avoid waste. The tube length calculation subroutine is illustrated by the flow chart shown in FIG. 5. In particular, the subroutine is started at 334 followed by the setting of some initial conditions at 336. In particular, the tube length (L) to be calculated is set to zero, the bend number $n$ is set at 1 and the term $DOB_{n-1}$ is fed equal to zero.

The motion data derivation of subroutine illustrated in FIG. 11 is then performed for bend $n$ at 338. The material arc length constant K obtained in the calibration calculation subroutine shown in FIG. 9 is then multiplied by $DOB_{n-1}$ at 340 to obtain the arc length (J) for that bend. The accumulated tube length (L) is then increased by the distance to bend $n$, $DBB_n$ and the arc length (J) of the previous bend $DOB_{n-1}$ at 342. The bend number $n$ is then incremented by 1 at 344 and it is determined if $n$ is equal to the total number of bends $N + 1$ at 346 and if not, the motion data derivation subroutine is again performed for bend $n$ at 338 and the calculations again performed. If all the bends for the tube have been completed and the bend data calculated to the end of the tube, the bend number $n$ is equal to $N + 1$ and the data "TUBE LENGTH = L" is displayed at 348 and a return is made at 350 to the automatic subroutine.

INTERRUPT SUBROUTINE

The relatively slow machine operations of the automatic tube bending machine utilized with the present invention are conventionally controlled by the computer 54 by using the well known machine service interrupt technique in which the arithmetic and data processing functions of the computer 54 are periodically interrupted to "service" the sensors and actuators of the tube bending machine.

The use of this technique permits the computer to be calculating the operating commands for the next bend while the previously calculated commands are being relatively slowly executed by the machine.

Figure 13:
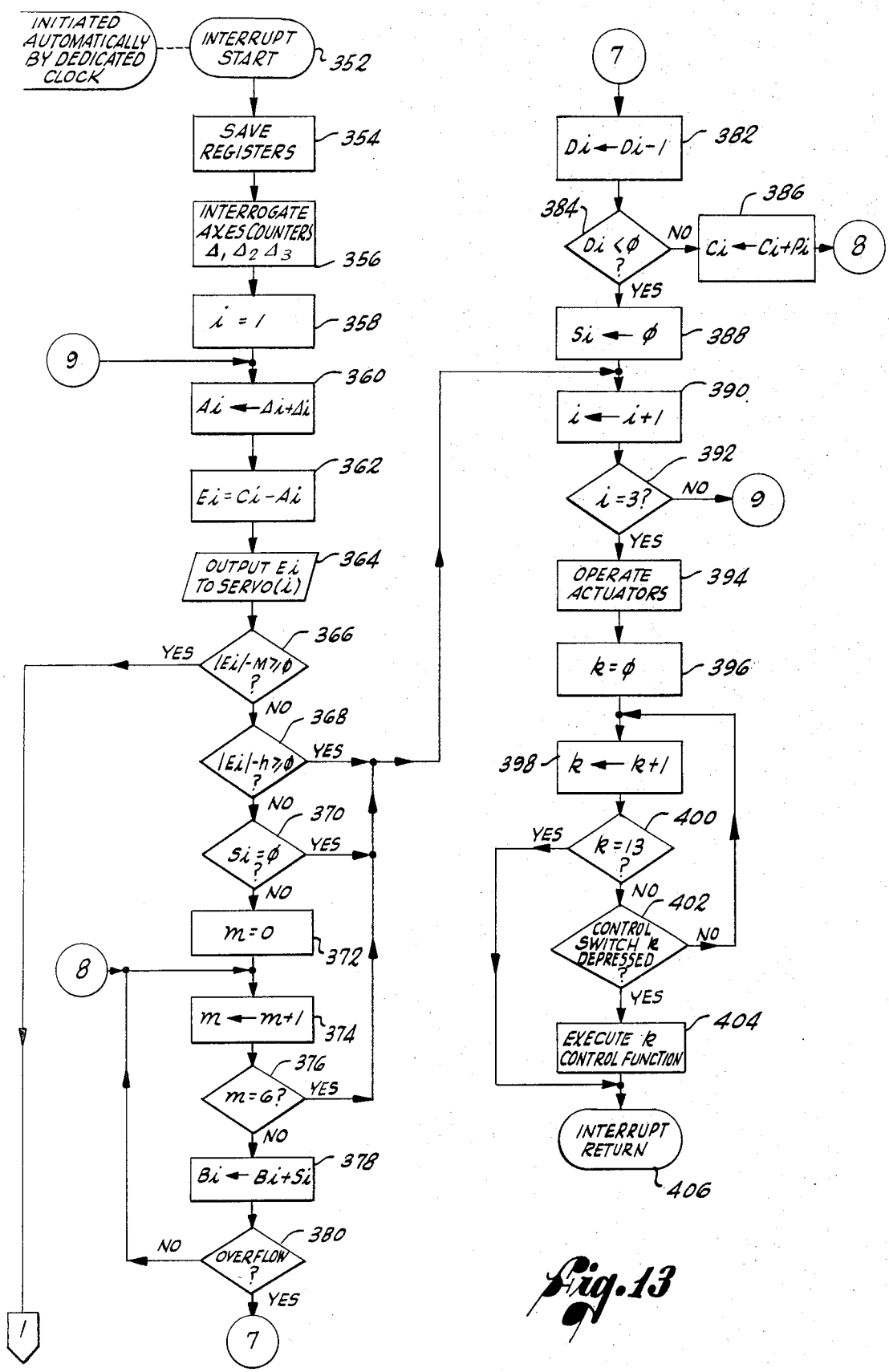
FIG. 13 is a flow chart of the machine service interrupt subroutine.

The service interrupt subroutine is illustrated by a flow chart shown in FIG. 13. The interrupt subroutine is started at 352 and all of the registers containing data in process are saved at 354. The axis motion counters 90 (FIG. 2) are then interrogated at 356 and their contents temporarily stored during the interrupt routine. The axis motion counters 90 are incremental in nature and following each interrogation they are reset to zero. Thus, the data stored during the interrogation at 356 is the axis motion increment since the last interrogation and is generally designated as $\Delta 1$, $\Delta 2$ and $\Delta 3$ for the incremental motion in the three axes.

In performing the calculations for the command for the three axes, the general counter content $\Delta_i$ is used and the index $i$ is set equal to zero at 358. The general term $A_i$ is the present position of the tube in any of the three axes and $A_i$ is updated by adding to it $\Delta_i$ at 360.

$C_i$ is the general term for the commanded position in the $i$ axes and the general error term $E_i$ for the velocity servos is generated by subtracting $A_i$ the present position from $C_i$ the commanded position at 362. The error $E_i$ is then the output to the servomechanism in the $i$ axis at 364.

At this point, the error signal $E_i$ is tested against a maximum by subtracting its absolute value from that maximum M and testing whether the difference is equal to or greater than zero at 366. If the error $E_i$ is greater than the maximum, a status error is indicated and the subroutine returns through off-page connector 1 to the start condition. If the error signal $E_i$ is not greater than the maximum, it is tested again for a hold limit. If the hold limit is exceeded, the commanded position $C_i$ will not be incremented until the present position $A_i$ along the axis reduces the error to within the hold limit. If the hold limit is not exceeded, it is determined whether the speed code $S_i$ for the axes is zero at 370. It should be noted that for the velocity servomechanisms utilized with the present invention, there is movement along an axis only when a speed code $S_i$ is non-zero for that axis. As will be noted below, when the commanded position reaches the desired position along an axis, the speed code $S_i$ is set equal to zero at that point. Therefore, if the speed code $S_i$ is zero, the calculation of a new commanded position $C_i$ is skipped.

To facilitate changing the speed of movement along any of the axes, the rate of change of the commanded position $C_i$ is determined by means of a balance overflow technique in which the specified speed code $S_i$ is successively added to itself until a predetermined balance is exceeded whereupon the commanded position is incremented.

In the presently preferred embodiment, in the calculation of a commanded position $C_i$ for each axis, an arbitrary number of six successive additions are permitted and the commanded position incremented however number of times there is a balance overflow. Thus, it can be seen that if the speed code $S_i$ is a large number, the balance $B_i$ may be exceeded more than once in the successive count of six. However, if the speed code $S_i$ is a relatively low number, the balance $B_i$ may not be exceeded at all during the six counts.

Thus, if the speed code $S_i$ is not zero at 370, a speed balance counter $m$ is set to zero at 372 and incremented at 374. At 376 it is determined if the count equals six, if not, the present balance $B_i$ is incremented by the speed code $S_i$ at 378 and it is determined if there is an overflow at 380. If not, the counter $m$ is incremented at 374 and the total count checked again at 376. If the counter $m$ reaches six before there is an overflow, the commanded position $C_i$ is not incremented during that interrogation period.

If there is an overflow at 380 before the counter $m$ equals six, the subroutine proceeds through connector 7 and the generalized desired position $D_i$ is decremented by one at 382 and it is determined at 384 if the decremented $D_i$ is less than zero. If not, the commanded position $C_i$ is incremented at 386 by a polarity factor $P_i$ which is either plus or minus 1 depending on the desired direction of movement in the axes. The subroutine then proceeds through connector 8 back to the incrementation of the speed balance counter $m$ at 374. If the desired position $D_i$ has decremented to less than zero at 384, the speed code $S_i$ is set equal to zero at 388 and the axis index $i$ is incremented at 390 and at 392 it is determined if all of the motion commands for the axes have been calculated or whether $i$ is equal to 3. If not, the subroutine proceeds through connector 9 and the positional calculations beginning at 360 are again performed. If all of the axes calculations have been made, all of the pertinent machine actuators 98 are operated at 394.

A control counter $k$ is then set equal to zero at 396 and incremented at 398. The control counter $k$ is then checked against its maximum 13 at 400 and if the maximum has not been reached, a check is made at 402 to see if the control switch associated with the counter $k$ has been depressed. If not, $k$ is incremented at 398 and checked against its maximum again at 400 and the next control switch is again checked at 402. If the control switch for counter $k$ is depressed, the $k$-th control function is executed at 404. The interrupt subroutine is then returned at 406 to the point in any of the other subroutines at which the interrupt occurred. If all of the control switches are checked and none found to be depressed, the maximum check at 400 will be "YES" and the interrupt subroutine also returned at 406.

The method and apparatus of the present invention for automatic tube bending therefore permits the direct use of given bend data with the needed overbend angles and compensations being automatically calculated and incorporated in the machine motion commands. The bend data may include varying bend radii with an incremental bending technique being automatically utilized where possible. Control of the tube bending machine is easily effected by a relatively unskilled operator by using an operator response type of sequential operation.

While a presently preferred embodiment of the method and apparatus of the present invention has been described in detail herein, the invention is not to be limited except by the following claims.

We claim:

1. In a method of bending a tube having substantially deformable and partially resilient material characteristics to a shape specified by given bend data consisting of, at least one bend angle with a given degree of bend (DOB) and a bend radius ($R_B$), and straight distances between bends (DBB)

with a tube bending machine having a bend die with a given bend die radius ($R_C$), said given degree of bend (DOB), bend radius ($R_B$), distance between bends (DBB) and bend die radius ($R_C$) being designated as known parameters, said tube bending machine being under the control of an automatic controller capable of directing said machine in predetermined sequential machine steps, particular sequences of machine steps being manually selectable by a human operator, the improvement comprising the steps of:

calibrating said tube having machine and said automatic controller for the resilient characteristics of said tube material performing a calibration procedure including, manually activating said controller and machine to automatically execute at least two test bends with known test bend angles and bend radii, said test bend angles and bend radii being included in said known parameters, measuring the resultant bend angles and entering said resultant bend angles into said controller, said resultant bend angles being thereafter included in said known parameters, manually activating said controller and machine to automatically calculate a fixed springback compensation factor from said resultant bend angles, said known test bend angles, said known parameters and a given fixed springback compensation factor arithmetic relationship, and to calculate a radial springback compensation factor from said known parameters and a given radial springback compensation factor arithmetic relationship;

deriving motion data to be executed by said machine and said controller by manually activating said controller to perform an automatic motion data derivation procedure including, calculating the radial springback compensation value from said radial springback compensation factor, said known parameters and a given radial springback compensation value arithmetic relationship, calculating the total radial and fixed springback compensation value from said radial springback compensation value, said fixed springback compensation factor and a given total radial and fixed springback compensation value arithmetic relationship, calculating a compensated distance between bends value from said known parameters, said total radial and fixed springback compensation value, and a given compensated distance between bends value arithmetic relationship, calculating an overbend angle from said known parameters and a given overbend angle arithmetic relationship.

2. The method defined in claim 1, including the step of:

executing said derived motion data in accordance with an automatic execution procedure generated by said controller and executed by said machine.

3. The method defined in claim 1 wherein:

said motion data deriving step includes testing said bend angle and bend radius for each bend to determine if said bend may be executed by a plurality of compensated incremental bends and using said incremental bends when possible.

4. The method defined in claim 3 including the step of:

precomputing during said motion data deriving step the total length of tube material required to produce a tube of said specified shape by calculating a material arc length constant from said known parameters and a given arc length constant arithmetic relationship, said arc length constant relating a bend angle to the length of tube required for an associated bend and initially performing said motion data deriving step for each bend specified by said bend data and combining generated compensated distances between bends and overbend angles with the length of tube material required for the bends as determined by said material arc length constant.

5. The method defined in claim 3 wherein said testing step includes the automatically performed steps of:

making a trial division of the given degree of bend angle by a trial number of incremental bends;

comparing the resultant trial bend angle and calculated compensations for fixed and radial springback therefor with a bending machine configuration to be utilized;

iteratively incrementing said trial number of incremental bends and performing said trial division and comparing steps until said comparing step indicates that the trial number of incremental bends cannot be performed by said machine configuration; and using a bend angle and associated compensations for a number of incremental bends which is one less than said trial number.

6. The method defined in claim 1 including:

selectively and sequentially initiating said calibrating step and said motion data deriving step by a human operator responding to a sequence of questions and statements automatically generated by said controller and displayed by a display device.

7. The method defined in claim 6 including:

storing the bend data for a plurality of different specified tube shapes and selecting a bend data for a desired specified tube shape by a human operator responding to an automatically displayed question therefor generated by said controller.

8. The method defined in claim 6 wherein:

said motion data deriving step includes testing said bend angle and bend radius for each bend to determine if said bend may be executed by a plurality of compensated incremental bends and using said incremental bends when possible.

9. The method defined in claim 8 wherein said testing step includes the automatically performed steps of:

making a trial division of the given degree of bend angle by a trial number of incremental bends;

comparing the resultant trial bend angle and calculated compensations for fixed and radial springback therefor with a bending machine configuration to be utilized;

iteratively incrementing said trial number of incremental bends and performing said trial division and comparing steps until said comparing step indicates that the trial number of incremental bends cannot be performed by said machine configuration; and using a bend angle and associated compensations for a number of incremental bends which is one less than said trial number.

10. In a method of bending a tube having substantially deformable and partially resilient material characteristics to a shape specified by given bend data consisting of, at least one bend angle with a given degree of bend (DOB) and a bend radius ($R_B$), and straight distances between bends (DBB)

with a tube bending machine having a bend die with a given bend die radius ($R_C$), said given degree of bend (DOB), bend radius ($R_B$), distance between bends (DBB) and bend die radius ($R_C$) being designated as known parameters, said tube bending machine being under the control of an automatic controller capable of directing said machine in predetermined sequential machine steps, particular sequences of machine steps being manually selectable by a human operator, the improvement comprising the steps of:

calibrating said tube bending machine and said automatic controller for the resilient characteristics of said tube material by manually inserting a test tube into said machine and performing a calibration procedure including, manually activating said controller and machine to automatically execute at least two test bends with known test bend angles and bend radii, said test bend angles and bend radii being included in said known parameters, measuring the resultant bend angles and entering said resultant bend angles into said controller, said resultant bend angles being thereafter included in said known parameters, manually activating said controller and machine to automatically calculate a fixed spring back compensating factor from said resultant bend angles, said known test bend angles, said known parameters and a given fixed spring back compensation factor arithmetic relationship, and to calculate a radial springback compensation factor from said known parameters and a given radial springback compensation factor arithmetic relationship;

testing said given bend data for each bend to determine if said bend may be executed by a plurality of compensated incremental bends, said testing being performed by said controller in an automatic testing sequence including, making a trial division of the given degree of bend angle for each bend by a trial number of incremental bends, deriving motion data to be executed by said machine in said controller by manually activating said controller to perform an automatic motion data derivation procedure including, calculating the radial springback compensation value from said radial springback compensation factor, said known parameters and a given radial springback compensation value arithmetic relationship;

calculating the total radial and fixed springback compensation value from said radial springback compensation value, said fixed springback compensation factor and a given total radial and fixed springback compensation value arithmetic relationship, calculating a compensated distance between bends value from said known parameters, said total radial and fixed springback compensation value, and a given compensated distance between bends value arithmetic relationship, calculating an overbend angle from said known parameters and a given overbend angle arithmetic relationship;

comparing the resultant trial bend angle value and calculated compensation value for fixed and radial springback with said known parameters and a bending machine configuration to be used, iteratively incrementing said trial number of incremental bends and performing said trial division, motion data derivation and comparing steps until said comparing step indicates that said trial number of incremental bends cannot be performed by said machine configuration and using a final bend angle value and associated compensation values for a total number of incremental bends one less than said trial number.

11. The method defined in claim 10 including the step of:

precomputing the total length of tube material required to produce a tube of said specified shape by calculating, during said calibrating step, a material arc length constant from said known parameters and a given arc length constant arithmetic relationship, said arc length constant relating a bend angle to the length of tube required for an associated bend and initially performing said trial division, motion data deriving, comparing, and incrementing steps to generate said operating commands and combining compensated distance between bends and overbend angles with calculated lengths of tube material required for the bends of said given bend data as determined by said material arc length constant.

12. The method defined in claim 11 including:

displaying by automatic controller generated display sequence of tube material required to produce a tube of said specified shape.

13. The method defined in claim 10 including:

storing the bend data for a plurality of different specified tube shapes and selecting the desired tube shape by human operator response to questions and statements automatically generated by said controller and displayed by a display device.

14. A method of deriving motion data for use in a bending machine having a given bend die radius ($R_C$) to bend a material having substantially deformable and partially resilient material characteristics to a shape specified by given bend data consisting of, at least one bend angle with a given degree of bend (DOB) and a bend radius ($R_C$), and straight distances between bends (DBB), said given bend die radius ($R_C$), said given degree of bend (DOB), said bend die radius ($R_B$), distance between bends (DBB) being designated as known parameters, said method comprising the steps of;

performing a calibration procedure to predetermine the resilient characteristics of said material by executing two test bends in a test piece of said material with a bending machine, said test bend angles being known parameters;

measuring the resultant bend angles in said test tube, said resultant bend angles being thereafter known parameters;

entering all of said known parameters into an automatic controller;

calculating a fixed springback compensating factor from said resultant bend angles said known test bend angles said known parameters and a given fixed springback compensation factor arithmetic relationship;

calculating a radial springback compensation factor from said known parameters and a given radial springback compensation factor arithmetic relationship; and testing said given bend data for each bend to determine if said bend may be executed by a plurality of compensated incremental bends, said testing being performed by said controller in an automatic testing sequence including, making a trial division of the given degree of bend angle for each bend by a trial number of incremental bends, deriving motion data to be executed by said machine in said controller by manually activating said controller to perform an automatic motion data derivation procedure including, calculating the radial springback compensation value from said radial springback compensation factor, said known parameters and a given radial springback compensation value arithmetic relationship, calculating the total radial and fixed springback compensation value from said radial springback compensation value, said fixed springback compensation factor and a given total radial and fixed springback compensation value arithmetic relationship, calculating a compensated distance between bends value from said known parameters, said total radial and fixed springback compensation value, and a given compensated distance between bends value arithmetic relationship, calculating an overbend angle from said known parameters and a given overbend angle arithmetic relationship;

comparing the resultant trial bend angle value and calculated compensation value for fixed and radial springback with said known parameters and a bending machine configuration to be used, iteratively incrementing said trial number of incremental bends and performing said trial division, motion data derivation and comparing steps until said comparing step indicates that said trial number of incremental bends cannot be performed by said machine configuration and using a final bend angle value and associated compensation values for a total number of incremental bends one less than said trial number.

15. In a method of deriving motion data for use in bending a substantially deformable and partially resilient material characteristics to a shape specified by given bend data consisting of, at least one bend angle with a given degree of bend (DOB) and a bend radius ($R_B$), and straight distances between bends (DBB)

with a bending machine having a bend die with a given bend die radius ($R_C$), said given degree of bend (DOB), bend radius ($R_B$), distance between bends (DBB) and bend die radius ($R_C$) being designated as known parameters, said tube bending machine being under the control of an automatic controller capable of directing said machine in predetermined sequential machine steps, particular sequences of machine steps being manually selectable by a human operator, the improvement comprising the steps of:

calibrating said bending machine and said automatic controller for the resilient characteristics of said material by performing a calibration procedure including, manually activating said controller and machine to automatically execute at least two test bends with known test bend angles and bend radii, said test bend angles and bend radii being included in said known parameters, measuring the resultant bend angles and entering said resultant bend angles into said controller, said resultant bend angles being thereafter included in said known parameters, manually activating said controller and machine to automatically calculate a fixed springback compensation factor from said resultant bend angles, said known test bend angles, said known parameters and a given fixed springback compensation factor arithmetic relationship, and to calculate a radial springback compensation factor from said known parameters and a given radial springback compensation factor arithmetic relationship;

deriving motion data to be executed by manually activating said controller to perform an automatic motion data derivation procedure including, calculating the radial springback compensation value from said radial springback compensation factor, said known parameters and a given radial springback compensation value arithmetic relationship, calculating the total radial and fixed springback compensation value from said radial springback compensation value, said fixed springback compensation factor and a given total radial and fixed springback compensation value arithmetic relationship, calculating a compensated distance between bends value from said known parameters, said total radial and fixed springback compensation value, and a given compensated distance between bends value arithmetic relationship, calculating an overbend angle from said known parameters and a given overbend angle arithmetic relationship.

* * * * *

UNITED STATES PATENT OFFICE
CERTIFICATE OF CORRECTION

Patent No. 3,821,525  Dated June 28, 1974

Inventor(s) HOMER L. EATON and WALTER I. SHEVELL

It is certified that error appears in the above-identified patent and that said Letters Patent are hereby corrected as shown below:

Column 3, line 42, "collect" should be --collet--; line 53, "of" should be --and--.

Column 4, line 62, "axis" should be --axes--.

Column 5, line 40, "DOB" should be --POB--.

Column 7, line 40, "new" should be --now--.

Column 8, line 7, "SEMIAUTOMATIC" should be --SEMI-AUTOMATIC--.

Column 12, line 25, "to" should be --two--; line 32, delete ["] and insert therefor --____"--; line 34, delete ["] and insert therefor --____"--.

Column 13, line 10, the equation should read
$$R_c / 2 = R' - R_c.$$

Column 14, line 23, before "294" insert --at--.

Column 18, line 33, "having" should be --bending--.

Column 20, line 56, "spring back" should be --springback--; line 59, "spring back" should be --springback--.

Signed and sealed this 22nd day of October 1974.

(SEAL)
Attest:

McCOY M. GIBSON JR.
Attesting Officer

C. MARSHALL DANN
Commissioner of Patents